(12) United States Patent
Kochan et al.

(10) Patent No.: US 11,593,304 B2
(45) Date of Patent: Feb. 28, 2023

(54) BROWSABILITY OF BACKUP FILES USING DATA STORAGE PARTITIONING

(71) Applicant: Western Digital Technologies, Inc., Irvine, CA (US)

(72) Inventors: Linh Kochan, Newport Coast, CA (US); Shawn Miller, Aliso Viejo, CA (US); Michael A. Dolan, Orange, CA (US); Sean Rohr, Eastvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 186 days.

(21) Appl. No.: 16/551,235

(22) Filed: Aug. 26, 2019

(65) Prior Publication Data

US 2019/0377709 A1    Dec. 12, 2019

Related U.S. Application Data

(63) Continuation of application No. 14/736,784, filed on Jun. 11, 2015, now Pat. No. 10,394,760.

(60) Provisional application No. 62/148,443, filed on Apr. 16, 2015.

(51) Int. Cl.
| | |
|---|---|
| *G06F 16/00* | (2019.01) |
| *G06F 16/14* | (2019.01) |
| *G06F 3/06* | (2006.01) |
| *G06F 11/14* | (2006.01) |
| *G06F 16/27* | (2019.01) |
| *G06F 16/11* | (2019.01) |

(52) U.S. Cl.
CPC ............ *G06F 16/152* (2019.01); *G06F 3/065* (2013.01); *G06F 3/0608* (2013.01); *G06F 3/0619* (2013.01); *G06F 3/0641* (2013.01); *G06F 3/0679* (2013.01); *G06F 11/1451* (2013.01); *G06F 16/128* (2019.01); *G06F 16/27* (2019.01); *G06F 2201/80* (2013.01)

(58) Field of Classification Search
CPC .................................................... G06F 16/152
USPC ........................................................ 707/646
See application file for complete search history.

(56) References Cited

U.S. PATENT DOCUMENTS

| | | | | |
|---|---|---|---|---|
| 2010/0223441 | A1* | 9/2010 | Lillibridge | ............ G06F 3/0608 |
| | | | | 711/170 |
| 2014/0250066 | A1* | 9/2014 | Calkowski | .......... H04L 67/1097 |
| | | | | 707/624 |
| 2016/0078068 | A1* | 3/2016 | Agrawal | ............... G06F 16/215 |
| | | | | 707/692 |
| 2016/0080523 | A1* | 3/2016 | Sethi | ....................... H04L 67/02 |
| | | | | 706/12 |

* cited by examiner

*Primary Examiner* — Alexandria Y Bromell
(74) *Attorney, Agent, or Firm* — Chang & Hale LLP (57) ABSTRACT

A data storage system includes non-volatile data storage including a container partition and a browsable partition and control circuitry configured to backup a file in the non-volatile data storage at least in part by receiving the file from a host, the file including a plurality of chunks of data, storing the plurality of chunks of data in the browsable partition of the non-volatile data storage, determining that one or more of the plurality of chunks has been modified, storing the one or more modified chunks in a container partition of the non-volatile data storage, determining a new chunk associated with each of the one or more modified chunks, and storing the one or more new chunks in the browsable partition of the non-volatile data storage.

20 Claims, 7 Drawing Sheets

BROWSABILITY OF BACKUP FILES USING DATA STORAGE PARTITIONING

RELATED APPLICATION

This application is a continuation of U.S. patent application Ser. No. 14/736,784, filed on Jun. 11, 2015, entitled BROWSABLE DATA BACKUP, the disclosure of which is hereby incorporated by reference in its entirety.

BACKGROUND

In computer systems, backup of data to a backup data store can provide data redundancy that allows for data to be restored after a data loss event.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to backing up data in a computing system.

Overview

Backing up data may involve creating full and/or partial/incremental copies of data that can be used to restore/recover previously-saved versions of data. Data storage backup may be beneficial for the purpose of restoring data in the event the data becomes corrupted or otherwise inaccessible. For example, backups may be used to restore data following a disaster. In addition, backups may be used to restore files that have been accidentally deleted or corrupted. Certain backup systems utilize containerized backup, wherein data containers are used as the destination for certain backup data. Data containers can advantageously make backups relatively more portable and enable backup history retention. The terms "container," "data container," "container location," "container partition," and the like are used herein according to their broad and ordinary meaning, and may refer to a file, blob or other data structure in which backup data/files can be stored.

In certain container backup solutions, all the data for an individual file to be backed up is maintained in a single blob/file. Container backup solutions may not generally allow for browsability in the native client operating system. Without browsability, custom user interface (UI) software may be necessary to view backup files.

Furthermore, in order to implement deduplication, files may be required to be stored in a container, such that only one copy of a unique block exists and all differential data is referenced using pointers to allow for file reconstruction. Therefore, traditional backup systems have generally been unable to provide both container-based backup and browsability.

According to various data deduplication processes, backing up of data involves splitting files into smaller chunks of data and, in order to save space and/or data transfer time, only saving those chunks that have changed during backup. In certain embodiments, a hash value is calculated for each hashable chunk of a file, such that the changed chunks may be identified by comparing hash values and identifying chunks that have changed hash values associated therewith. Such a process may provide a number of benefits. For example, if a chunk has not changed, such chunk is not saved, thereby saving data storage resources. In addition, if a hash value for a particular chunk in a file is found in another file, such chunk may be reused for the second and/or subsequent files; the redundant chunk is not saved again, and a corresponding entry in a metadata list of hashes for this file is instead updated to reflect the relationship.

Certain embodiments disclosed herein advantageously provide for backup systems including container-based backup as well as browsability. A backup system may include logic for storing a copy of a file in a browsable location/partition of a backup data store as part of an initial backup. The terms "location" and "partition" are used herein according to their broad and ordinary meaning, and may be used substantially interchangeably and may refer to any type or size of segment of data storage. When the file changes, the differential backup logic may provide for only old chunks to be copied to a container, such that a most recent version of the file is consistently maintained in the browsable location. The unchanged blocks may remain in the current version of the file in the browsable location. Embodiments disclosed herein for maintaining a complete copy of a file in a browsable location may be referred to herein as "reverse deduplication" in certain contexts. However, the use of such term is not intended to be limiting in any respect with regard to the presence or absence of functionality for a given embodiment.

The embodiments disclosed herein may save storage space and/or copy time, as less data may be required to be stored in the container when compared to certain other deduplication solutions. In addition, systems disclosed herein may not require keeping two copies of the most recent version of a file when the file does change. As a file is changed, certain methods disclosed herein may result in a single copy of a particular file in the browsable location as well as differential data stored in the container.

In certain embodiments, as described in greater detail below, each file chunk has its own data file (e.g., .hash file), file location pointer table, and/or chunk location index file in the container. In certain embodiments, to facilitate efficient sorting of files based on time stamp data, the file location pointer table file name may be prepended with the scheduled backup time, such as in Unix time format.

Data Storage System

Figure 1:
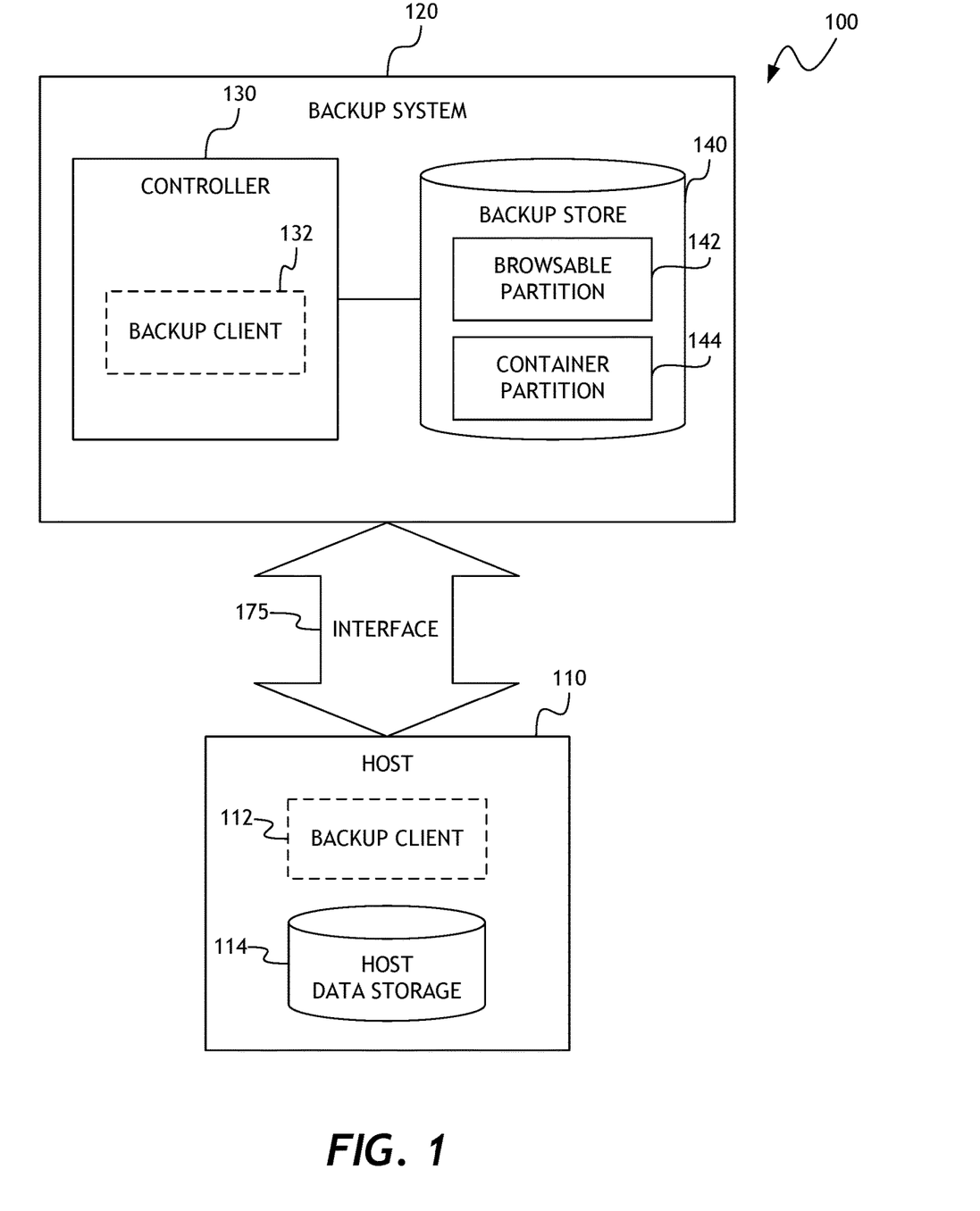
FIG. 1 is a block diagram of a computing system according to one or more embodiments.

FIG. 1 is a block diagram of a computing system 100 including a data storage backup system 120 and a host system 110 communicatively coupled to the backup system 120 over an interface 175. The interface 175 may be a wired or wireless interface connection, or any other type of communication interface such as, for example, SATA, USB, Thunderbolt, Ethernet, Wi-Fi, Bluetooth, PCIe, or the like.

The host system 110 may comprise one or more computing devices including one or more processors configured to execute code. The host 110 may further comprise one or more data storage modules, such as the host data store 114 illustrated in the figure. In certain embodiments, the host 110 may store user data in the host data store 114.

It may be desirable for the host system 110 to implement data redundancy by backing up user data to the backup system 120 in order to reduce the risk of data loss, or for other reasons. The host 110 may be configured to backup at least a portion of data stored in the host data store 114 to one or more external backup systems, including the backup system 120. The backup system 120 may be configured to receive data from the host system 110 over the interface 175 and backup such data in one or more nonvolatile storage modules 140, as directed by a backup client. The illustrated system 100 shows a backup client 132 implemented within a controller 130 of the backup system 120. Alternatively or additionally, the system 100 may be configured to implement data backup as directed by a backup client 112 that is a component of the host system 110. In certain embodiments described below, backup operations are advantageously directed by the backup client 112 of the host system 110. However, it should be understood that backup client logic may reside in any desirable or practical location within the scope of the present disclosure.

In certain embodiments, the backup system 120 comprises a direct-attached storage device (DAS). Alternatively, the backup system 120 may be a remote backup server system coupled to the host system 110 over a computer network, such as the Internet.

The backup client 112 of the host system 110 may issue read and/or write commands to the backup system 120 directing the backup system to save copies of data in the nonvolatile storage 140 of the backup system 120. In certain embodiments, the backup system 120 further maintains certain metadata tables or other data facilitating efficient backup and maintenance of user data in the non-volatile storage 140.

The backup store 140 may comprise one or more logical and/or physical partitions. For example, as illustrated, the data store 140 may include a container partition 144 configured to store historical backup data, as well as a browsable partition 142 configured to store current copies of data, as described herein.

The backup client logic may be configured to implement data deduplication, which may involve identifying and removing or preventing duplication of data within the data storage 140 without substantially compromising data fidelity and/or integrity. Deduplication may provide resiliency during hardware failures, and may further provide checksum validation on data and metadata, as well as redundancy for metadata and chunk data (e.g., frequently-accessed data chunks). Although the backup client of the system of FIG. 1 may implement certain traditional deduplication functionality, in view of the maintenance of current copies of backup files in the browsable partition, as described in greater detail below, the backup client may be considered to implement a modified, or reverse, deduplication logic, in certain embodiments.

In order to facilitate deduplication functionality, the backup client (132 and/or 112) may segment files into smaller-sized chunks (e.g., 32-128 KB), which may be variable in size in certain embodiments. The backup client may further identify duplicate chunks and maintain a single copy of each chunk. Redundant copies of the chunks may be replaced by references to the single copy, such references being described in metadata table(s). In certain embodiments, chunks are compressed and then organized into container files for containerized backup.

The term "chunk" is used herein according to its broad and ordinary meaning and may refer to any allocation or collection of data in any type of form or structure. Furthermore, references to "chunks" herein may be applicable to any type of data structure, such as chunks, heaps, blobs, files, blocks, pages, or other data structure. Chunks described herein may be of fixed or arbitrary size. In certain embodiments, chunk size may change dynamically.

For data deduplication purposes, chunks/files in the container partition 144 may be replaced with stubs that point to data blocks that are stored within a common chunk store of the non-volatile storage 140. During file access, the correct blocks/chunks may be assembled and served to the host system 110. The backup client (112/130) may further implement one or more data maintenance operations with respect to the non-volatile storage 140, such as optimization, garbage collection, wear leveling and/or scrubbing.

In order to implement deduplication functionality, the backup system 120 and/or host system 110 may maintain metadata indicating associations between files and chunks associated therewith, as well as hash values or other identifiers associated with the various files and/or chunks in order to allow for the identification of modifications or changes in user data that necessitate backing up or saving of such modified or changed file data according to the relevant deduplication protocol.

In certain embodiments, the system 100 is configured to save each hashable unit of a file as a separate chunk file. Such chunk files may be named with the hexadecimal hash value associated with the respective chunks. In certain embodiments, separate chunk files are save with a ".hash" file extension. The saving of chunks as separate chunk files may at least partially alleviate the need to append chunks to an ever-growing file or blob, as referenced above. Therefore, where backup repositories do not provide a method of appending chunks to a remote file, embodiments disclosed herein may allow for saving of modified/new chunks by the host system 110 in the backup system 120. For example, rather than calling an append function for appending the chunk to the file, a simple file save function may be called by the host system 110 to save the separate chunk files in the backup system 120.

Although not illustrated, the backup system 120 and host system 110 may include various other components and/or features, such as a volatile and/or nonvolatile memory modules, data transmission channels/interfaces, and/or, and/or processors, state machines, or other computational components.

The system of FIG. 1 may provide for a backup solution including file browsability, wherein files are accessible by the host 110 via a standard native operating system (OS) of the host (e.g., Windows File Explorer or OSX Finder), in combination with deduplication functionality. In certain embodiments, with regard to browsability, only a most-recent version of a file may be browsable, while other versions may be accessible using a custom UI by host 110.

Chunk-Level Files

Figure 2A:
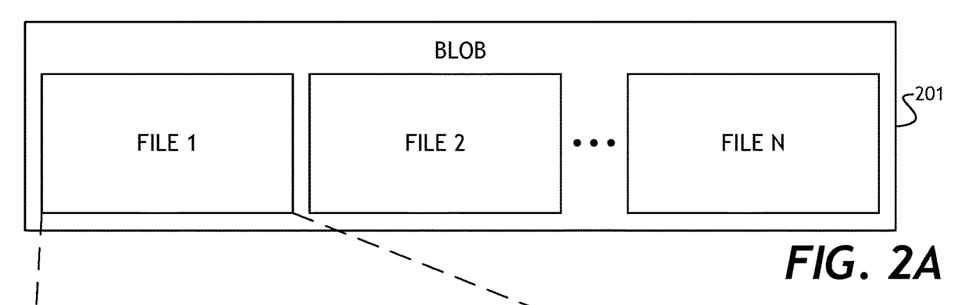
FIG. 2A is a block diagram illustrating a data blob including a plurality of files according to one or more embodiments.

FIG. 2A is a block diagram illustrating an embodiment of a data blob 201 of user data, the blob 201 including a plurality of files (File 1-File N). The term "blob" is used herein according to its broad and ordinary meeting and may refer to any of a plurality of types of data structures or units of data that may be stored in a backup data store. For example, "blob" may refer to a binary large object, file, stream, digital document, table, directory, database, archive, object, or other type of data structure, or collection of data in an unstructured, semi-structured or structured data storage environment. Furthermore, a blob may contain any type of data, such as images, audio or other multimedia objects, binary executable code, or other type of data. The blob 201 may have any desirable or practical size, such as approximately 2 GB, 4 GB, or some other value. The blob 201 may include any number of files of data, such as user data.

Figure 2B:
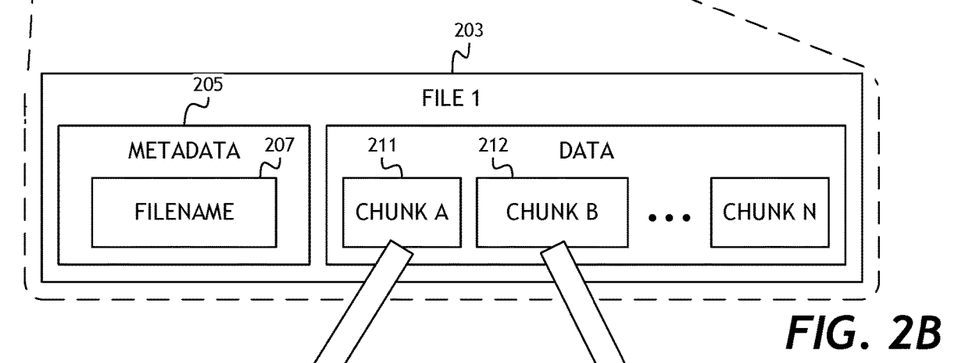
FIG. 2B is a block diagram illustrating a data file having a plurality of chunks of data according to one or more embodiments.

In certain embodiments, a file of user data may comprise a plurality of chunks of user data, each chunk representing a sub portion of the user data of the file. FIG. 2B illustrates a block diagram showing a file 203 having a plurality of chunks (Chunk A-Chunk N). The file 203 may further include metadata 205 associated with the user data of the file, such as a filename 207 or other file identifier.

For containerized backup, certain solutions provide for modified or new chunks associated with a file to be appended to a comprehensive file, or blob, wherein the comprehensive file/blob is continually expanded to include the modified/new chunks. However, certain backup systems may not allow for appending of chunks to files/blobs within the backup system, or such operation may be inconvenient or impractical. For example, a backup server may not provide a public-facing application programming interface (API) that would allow for a client system to cause modified/new chunks to be saved in the backup server without downloading the entire relevant file to the client first. Therefore, it may be necessary in such systems to pull a file down from the backup system, append modified/new chunks thereto, and push the entire file/blob including the appended chunks back up to the backup system, which may introduce various data transfer inefficiencies.

Figures 7A, 7B:
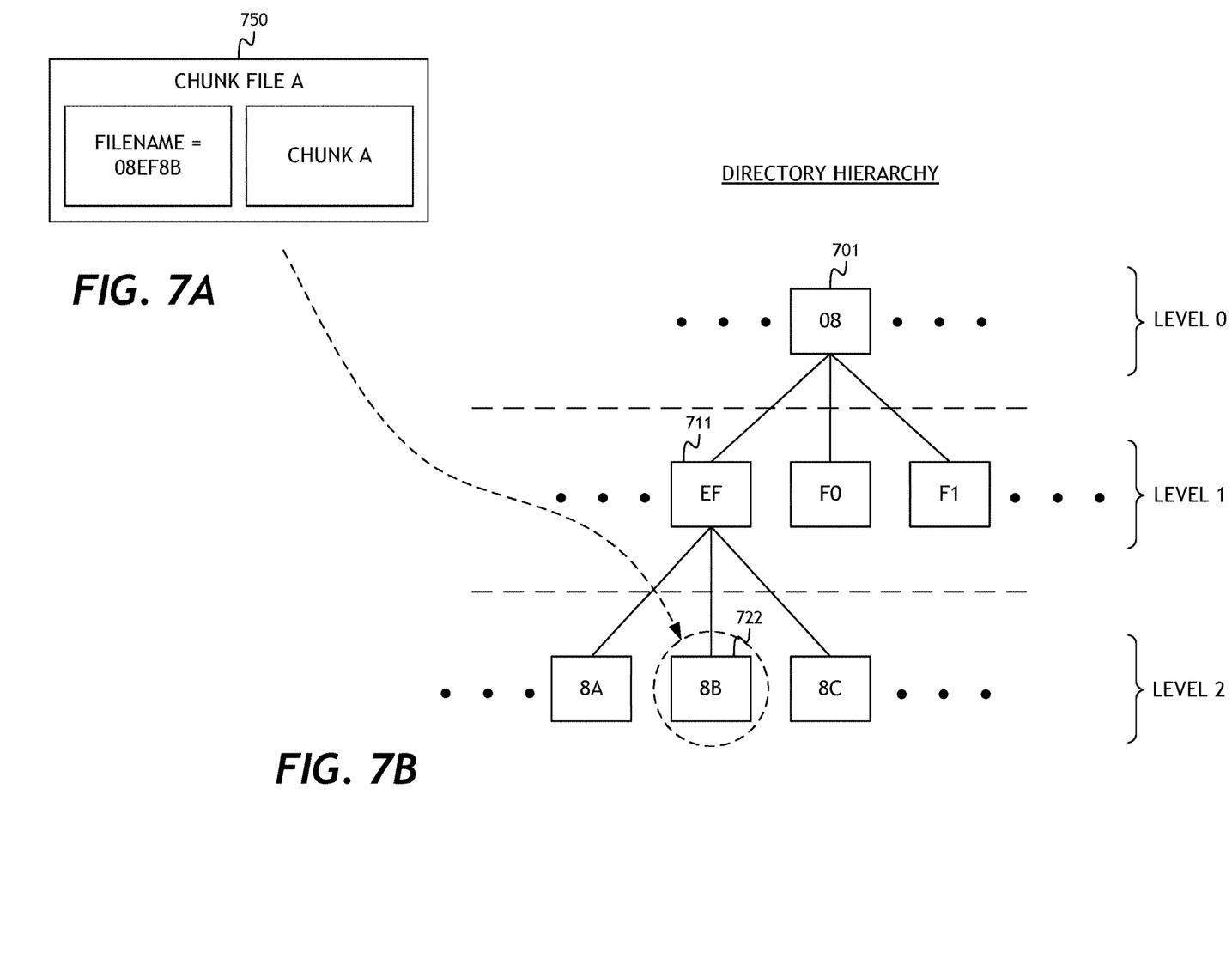
FIG. 7A illustrates a block diagram showing a chunk file according to one or more embodiments.
FIG. 7B is a block diagram illustrating a file directory hierarchy according to one or more embodiments.

Certain embodiments disclosed herein provide for improved backup efficiency in systems that may not allow for appended writing of chunks by generating stand-alone files for each modified/new chunk to be backed up. In certain embodiments, unique file chunks are associated with unique hash values that provide mapping information indicating where the chunk file resides in non-volatile storage of the backup system, as described in greater detail below with respect to FIG. 7. With individual chunk files saved to the backup data store, there may be no need to append new chunks to a single blob or other comprehensive data structure.

Figure 3:
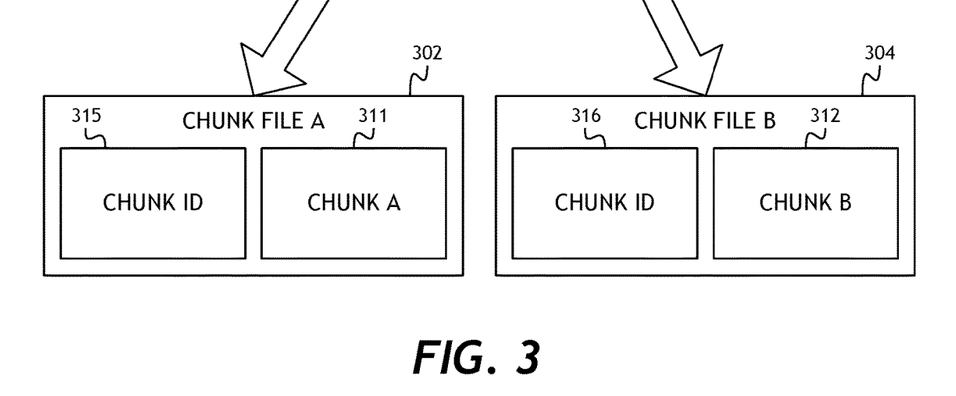
FIG. 3 is a block diagram illustrating an individual chunk file according to one or more embodiments.

The separate files stored for individual chunks of data are referred to herein as "chunk files." As shown in FIG. 3, an individual chunk 311 (chunk A) may be saved as an individual chunk file 302, wherein the chunk file comprises the chunk data 311 as well as a chunk identifier 315. The chunk identifier 315 may be, for example, a filename associated with the chunk file 302, or the like. Other chunks of the file 203 may likewise be saved as separate chunk files, such as Chunk File B 304, shown in FIG. 3. Similarly to the chunk file 302, the chunk file 304 includes a chunk identifier 316, as well as the chunk data 312. Utilization of chunk files like that shown in FIG. 3 may advantageously result in reducing the amount of data that needs to be saved, which may in turn free up resources for other purposes.

File Backup/Restore

Figure 4:
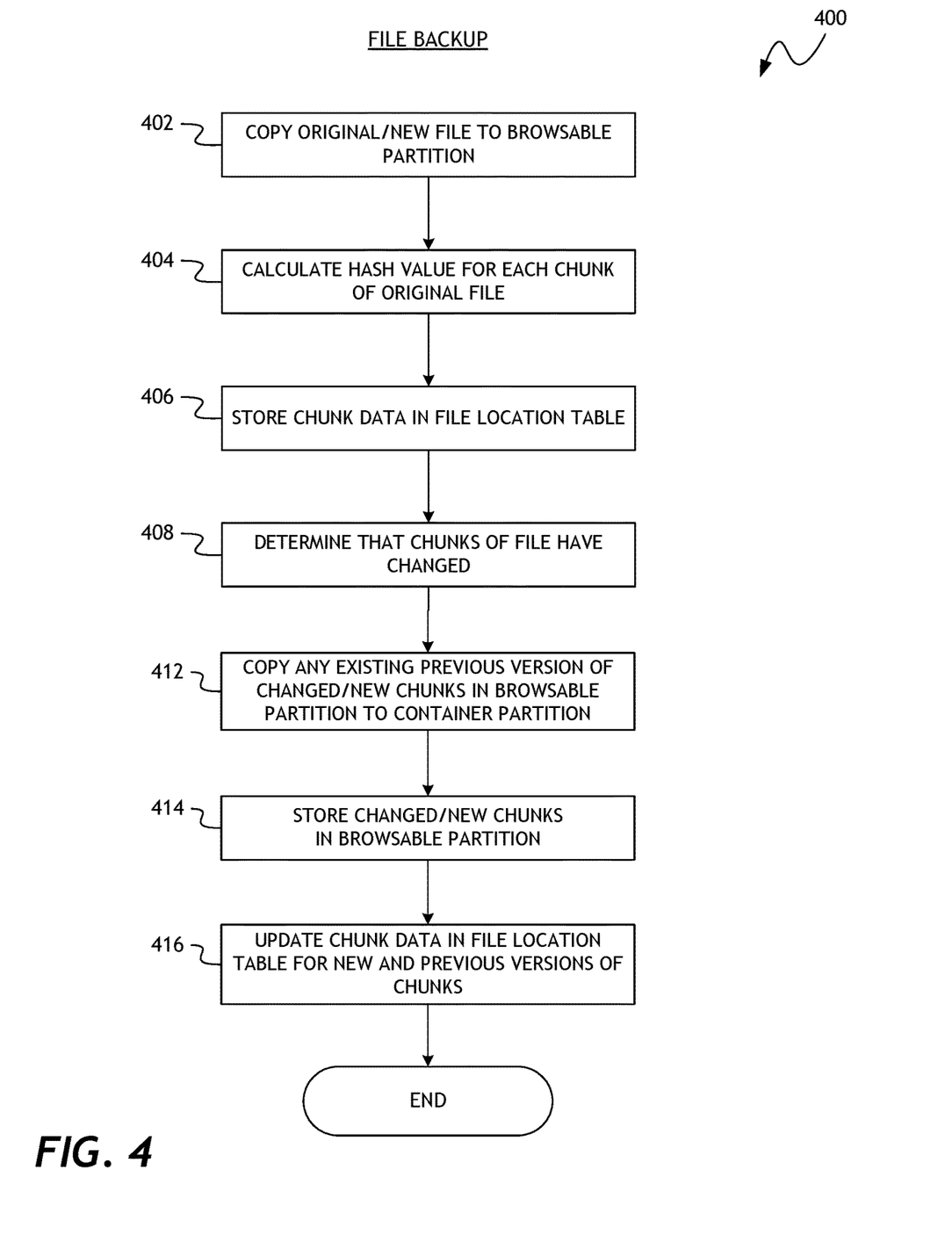
FIG. 4 is a flow diagram illustrating a process for backing up a file according to one or more embodiments.

FIG. 4 illustrates a process for backing up data in a backup data store according to one or more embodiments. The process 400 involves, at block 402, copying a new/original file to a browsable partition of a backup data store. That is, on the initial backup of a file, the entire original file may be copied to the browsable partition in the backup store. In certain embodiments, when a new file is backed up, the entire new file is copied to the browsable partition and no file chunks are stored in a container partition of the backup data store at that time.

At block 404, the process 400 involves calculating hash values corresponding to each of the chunks of the file. As each chunk of a file gets backed up, a hash value is calculated for that chunk and saved to a file location pointer table for that file. In certain embodiments, the process 400 allows for having only one copy of the entire backed-up file (i.e., the latest/current version of the file) in the browsable partition, wherein no duplicates of the full file exist in the container partition. Such implementation may advantageously provide improved efficiency when backing up large files that do not change, such as certain large music and video files, for example. Although block 404 may involve calculating hash values for each chunk of the file, in certain embodiments, no chunk files are generated at such point in the process.

At block 406, the process 400 involves storing the chunk data in a file location table. For example, a portion of the container partition may be utilized for maintaining metadata identifying the locations of chunks and/or files in the backup data store for file reconstruction purposes. Additionally or alternatively, file location table metadata may be maintained by the host in certain embodiments. In certain embodiments, each chunk may have a location index file that provides the stored location of the chunk content of the file. Such index file may be referenced by the file location table.

Blocks 402-406 correspond to an initial backup of a file in a backup system. The remaining blocks of the process 400 correspond to differential backup of a file. In certain embodiments, at the end of an initial backup, all original files are stored in the browsable location and no file chunks are stored in the container. At block 408, the process 400 involves determining that one or more chunks of the backed up file have been modified, or that one or more new chunks associated with the file have been generated. Such a determination may be made by comparing stored hash values associated with a file with has values associated with file data received from the host to determine whether such data includes changes or new hash values.

At block 412, the process 400 involves copying any existing previous versions of the changed or new chunks previously stored in the browsable location (e.g., at block 402) to the container partition. That is, when a source file changes, since the entire previous version of the changed file is stored (in chunks) in the browsable location, if the previous version of a chunk is not already in the container, the chunk is read from the browsable partition and copied to the container.

At block 414, the process 400 involves storing the changed or new chunks associated with the file in the browsable partition. The location index file for the previous version of the file may be updated to point to the new location of the chunk in the container. Because chunks of a file are only copied to the container when the file is modified, if the file is not modified, it will never be moved to the history container.

In certain embodiments, the previous version of the chunks of the file that have been changed are deleted from the browsable partition of the backup data store, leaving only the latest version of the file in the browsable partition, and chunks of old data in the container.

At block 416, the process 400 involves updating chunk data associated with the file in the file location table for new and previous versions of chunks. A new file location pointer table may be created for the changed file. The process 400, as described, may provide a backup solution including a container partition configured to maintain historical backup data, as well as browsability for current versions of backed-up files in the browsable partition.

Figure 5:
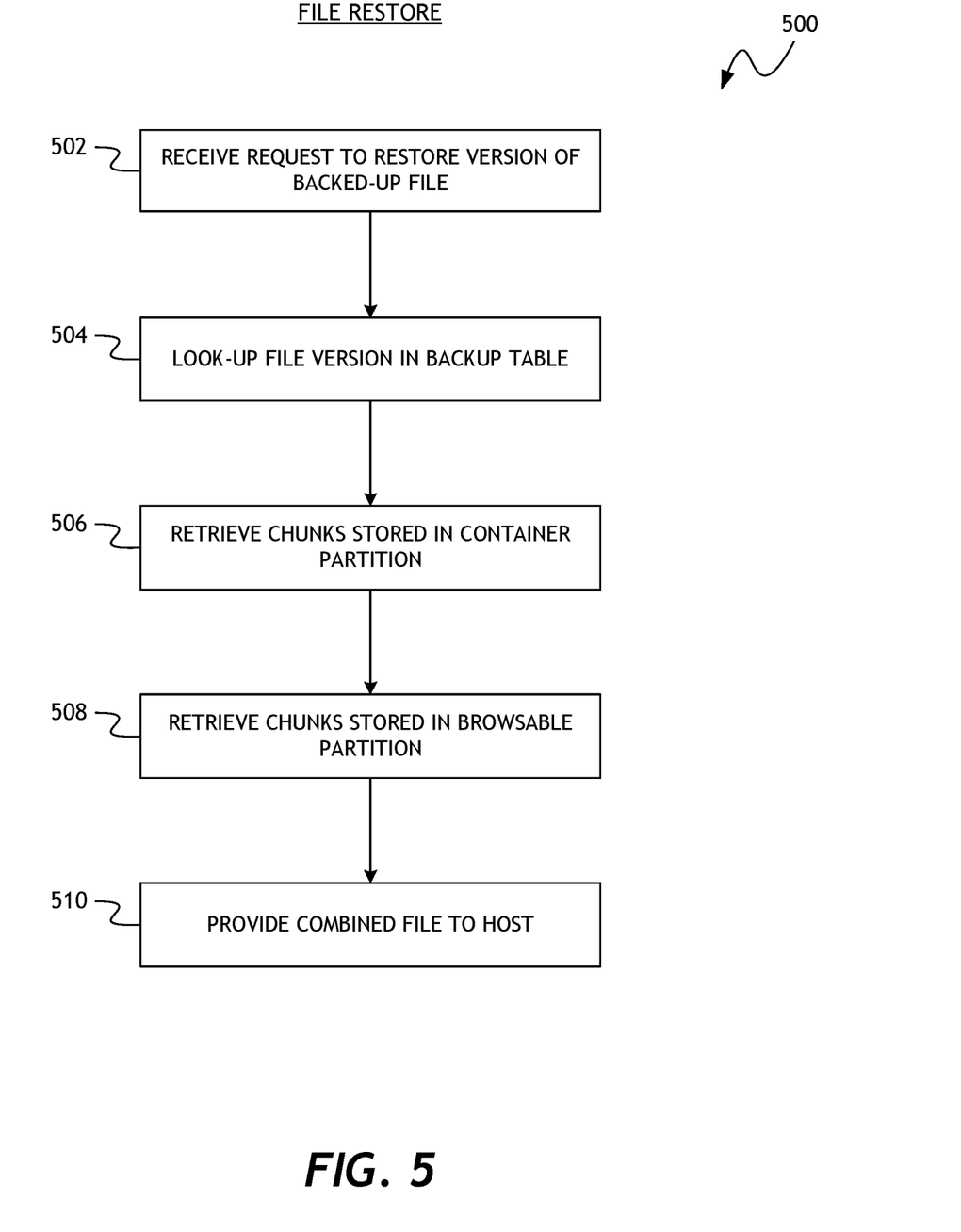
FIG. 5 is a flow diagram illustrating a process for restoring a file from a backup store according to one or more embodiments.

FIG. 5 illustrates a process 500 for restoring a file from a backup store according to one or more embodiments. The process 500 involves, at block 502, receiving a request from the host to restore a version of a backed up file. For example, the version may be a previously backed up version of a file that is different in some respect to a current version of the file stored in a browsable partition of the backup data store.

At block 504, the process 500 involves looking up the relevant file version in a backup file index table maintained by the backup system, such as in the container partition of the backup data store. In certain embodiments, the file index table identifies where various chunks associated with a file are located in the backup data store, along with possibly other metadata, such as hash values for the chunks, and/or the like.

At block 506, the process 500 involves retrieving chunks of the version of the file that are stored in a container partition of the backup data store. For example, such chunk locations may be identified in the file index table. At block 508, the process 500 may involve retrieving chunks of the version of the file that are maintained in the browsable partition of the backup data store. The chunks stored in the browsable partition may correspond to chunks of the file to be restored that are the same between the previous version of the file and the current version of the file. In certain embodiments, the location of such chunks in the browsable partition may be indicated by the file index table.

At block 510, the process 500 may involve combining the retrieved chunks from both the container partition and the browsable partition the backup data store to build the previous version of the file and providing the combined previous version of the file to the host. For example, the process 500 may involve generating a temporary file including the retrieved chunks of the file to be restored from the browsable and container partitions and providing the file to the host.

Figure 6A:
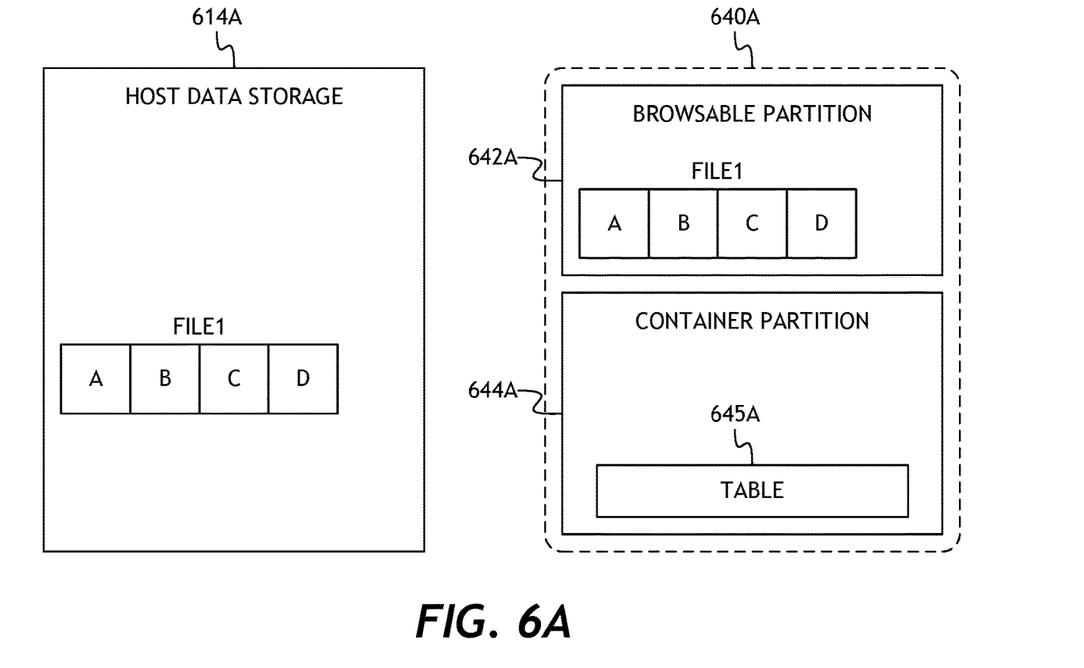
FIGS. 6A and 6B are block diagrams illustrating states of a data backup system according to one or more embodiments.
Figure 6B:
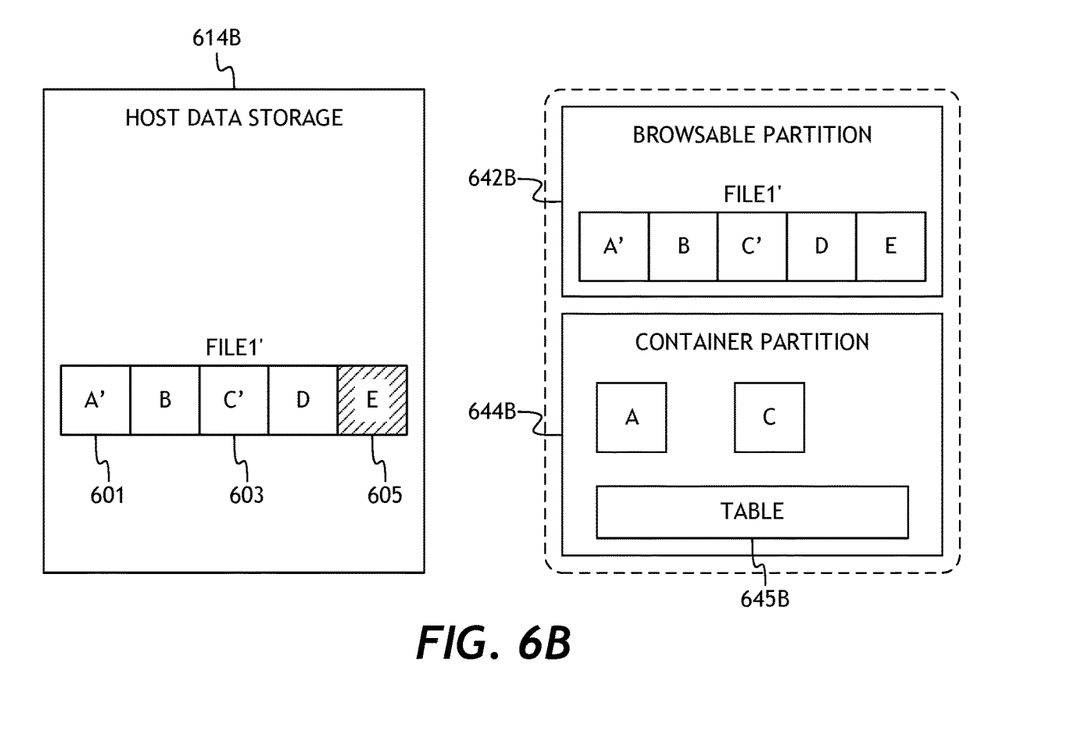

FIGS. 6A and 6B are block diagrams illustrating states of a data backup system according to one or more embodiments. FIG. 6A shows a state of the backup system corresponding to an initial backup of a file (FILE1), which is initially stored in data storage 614A of a host and backed-up to a backup data store 640A. The backup data store 640A comprises a browsable partition 642A and a container partition 644A, as described herein.

During initial backup, an entire copy of the file (FILE1) may be copied to the browsable partition 642A. Maintaining the entire file in the browsable partition may allow for the ability to natively browse the current version of the file by the host using, for example, a native file explorer of the host operating system. Index data indicating the locations of the chunks of the file (FILE1) in the browsable partition may be maintained in a metadata table 645A stored, for example, in the container partition 645A.

FIG. 6B shows a state of the backup system corresponding to a differential backup of the file, wherein the file (FILE1) has been modified to become a modified file (FILE1'), as shown in the host data store 614B. In certain embodiments, when a file changes, only the chunks of the file that are modified or new are stored in the browsable partition 642B. Therefore, as shown, the modified file chunks (A', C') are stored in the browsable partition 642B, as well as the new chunk (E').

The old versions of chunks associated with the file (FILE1) that have been modified in the modified file (FILE1') may be copied to the container partition 644B. Such chunks may further be removed from the browsable partition 642B. Furthermore, a new chunk location index file may be stored or referenced in the table 645B stored in the container partition 644B. The table 645B may include metadata indicating the location of the current version of the file (FILE1') in the browsable location, as well as the locations of the old versions of chunks associated with the file in the container partition 644B.

Whereas certain deduplication solutions may generally involve copying substantially all chunks to the container, solutions embodied in the examples of FIGS. 6A and 6B may provide for only the old chunks to be copied to the container, which may advantageously save storage space and/or copy time since it requires less data to be stored in the container. Furthermore, the solution of FIGS. 6A and 6B may not require that two copies of the latest version of a file be maintained when the file does change.

Filename Directory Location Identification

FIG. 7A illustrates a block diagram showing a chunk file 750 according to one or more embodiments. The chunk file 750 may include chunk data associated with a chunk (Chunk A) of a file, as well as certain metadata, such as a file name. In certain embodiments, the filename of the chunk file 750 indicates a location in a relevant file directory where the chunk file is stored.

FIG. 7B is a block diagram illustrating a file directory hierarchy according to one or more embodiments disclosed herein, wherein chunk files may be saved in various folders of the hierarchy. Generally, it may be desirable to avoid situations in which too many files are stored in a single directory folder, which may undesirably introduce excess overhead and/or result in prolonged chunk file storage and retrieval times. In order to avoid storing too many chunk files in a single directory, the chunk files may be saved into a directory hierarchy with each folder named for a byte or other portion or partition of the relevant hash value (e.g., hexadecimal hash value) format. The illustrated hierarchy of FIG. 7B is described below with reference to an example hash format including a three-byte hexadecimal hash value. Although the three-byte hexadecimal value is used for descriptive purposes, it should be understood that values of any format or length may be implemented, depending on the particular hashing convention implemented.

In certain embodiments, the path to the storage location of a hash file is encoded into the filename of the chunk file for ease of lookup. As a result, there may not be a need to save a separate path value into the data store that indexes the files that have been backed up. As shown, certain characters, symbols or bits/bytes of the filename may be associated with different levels of the filesystem hierarchy, and may identify a file location path within the hierarchy. As the hash values associated with the various saved chunk files may be, by their nature, unique values, certain embodiments therefore take advantage of such uniqueness for the purpose of reducing the amount of metadata necessary to locate the chunk files in the file directory.

FIG. 7B illustrates an example showing how such a directory path-identifying filename mechanism may be implemented. As an example, a file, such as the chunk file 750 shown in FIG. 7A, may have a filename "08EF8B." In the illustrated embodiment, each two symbols of the hexadecimal value may represent a separate level in the directory hierarchy. That is, for example, the first two symbols (or, e.g., the last two symbols) of the filename value may correspond to a highest level in the directory hierarchy. Although in the illustrated embodiment two symbols of the filename correspond to each of the respective levels of the directory hierarchy, other numbers of symbols or subsets of the filename value/string may be used to identify the various levels of the directory hierarchy.

With respect to the example filename "08EF8B," therefore, "08" may identify a highest level (Level 0) folder 401 of the relevant directory hierarchy. Therefore, the file 750 may be identified as being saved in a subfolder, or child folder, of the parent folder 701. The remaining symbols of the filename may identify each of the remaining levels of the hierarchy. For example, as shown, the third and fourth symbols "EF" may identify the next level folder 711 under which the file 750 is stored.

The last two characters "8B" identify the child subfolder 722 in which the file 750 is stored. As shown, the file 750 may be a chunk file including the filename, which is the storage location-identifying string described above identifying the storage location of the chunk file 750. The chunk file 750 further includes the chunk data.

By implementing the storage location path in this manner, embodiments disclosed herein may provide for reduced metadata requirements, as it may not be necessary to store file offset and number of bytes, as well as storage path information in the data store. Directory trees like that shown in FIG. 4 may further provide for relatively quick and easy access to chunk files.

File Backup Using File Move

Figure 8:
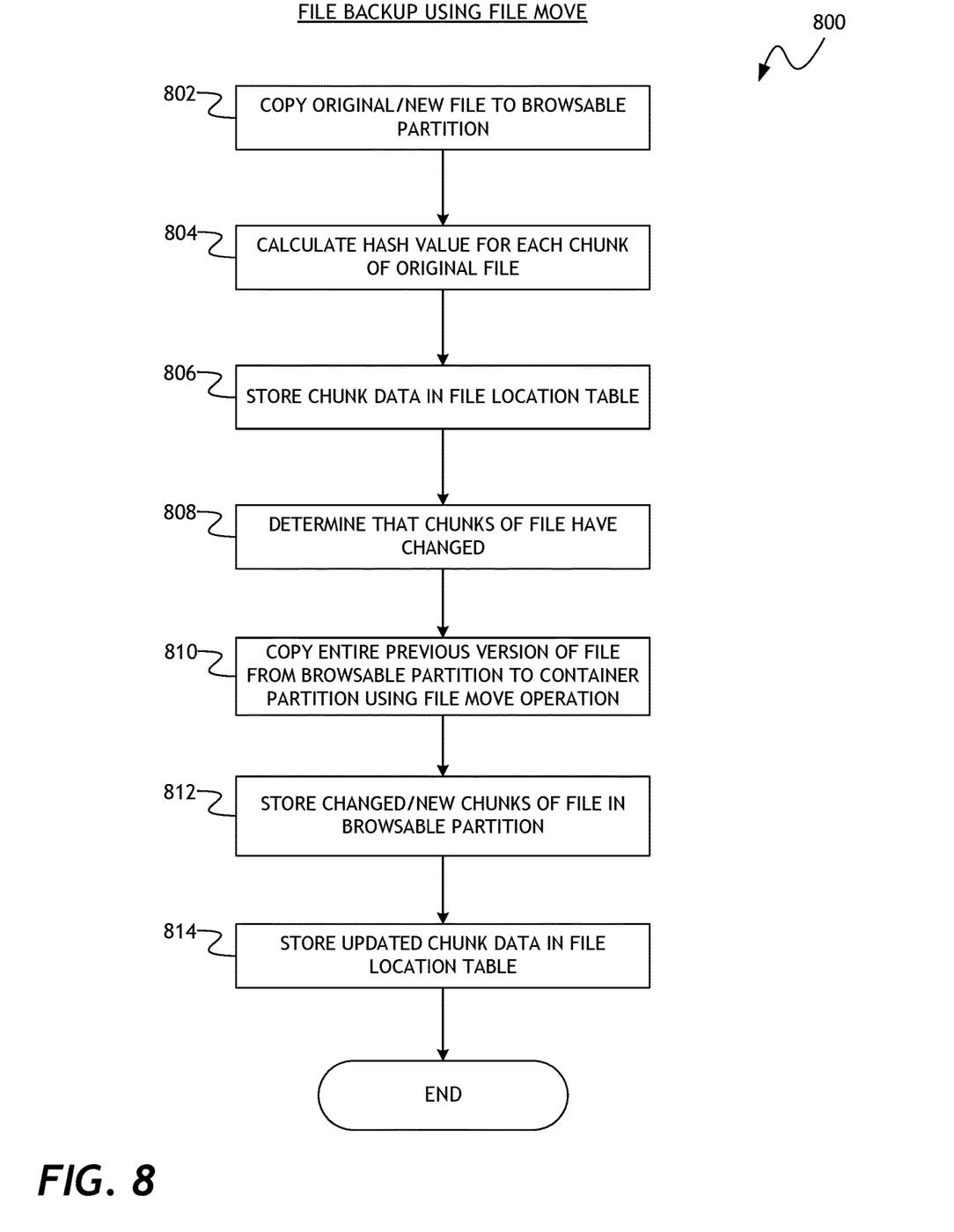
FIG. 8 is a flow diagram illustrating a process for backing up a file according to one or more embodiments.

FIG. 8 illustrates a flow diagram for process 800 of backing up data in a backup system according to one or more embodiments. The process 800 involves, at block 802, copying an original or new file to a browsable partition of the backup data store. For example, the copied file in the browsable partition may represent an original version of a file backed up in the backup system. That is, on the initial backup, the entire original file is copied to the browsable location in the backup store.

At block 804, the process 800 involves calculating hash values for each chunk of the original file. At block 806, the process 800 involves storing chunk data identifying the location of the various chunks of the original file in the browsable partition of the backup data store in a location table, which may be maintained in, for example, a container partition of the backup data store.

As each chunk of a file gets backed up, a hash value may be calculated for that chunk and saved to the file location pointer table for that file. Each chunk may also have a location index file that provides the stored location of the chunk content. Index files may be referenced by the file location pointer table. At the end of an initial backup, all original files may be located in the browsable partition, while substantially no chunks of the file are stored in the container partition.

Blocks 802-806 correspond to an initial backup of a file in a backup system. The remaining blocks of the process 800 correspond to differential backup of a file. At block 808, the process 800 involves determining that one or more chunks of the file have been modified or that one or more new chunks have been generated in connection with the backed up file.

At block 810, the process 800 involves copying an entire version of the file stored in the browsable partition to the container partition using a file move operation. That is, the process 800, rather than moving only old chunks to the container partition, involves moving the whole file from the browsable partition to the container partition of the backup data store; instead of writing each chunk to two different locations by moving each individual chunk into the container, you move the entire original file into the container space using a file move operation, resulting in two copies. When the file changes, new chunks are saved, rather than old chunks as with certain other methods.

At block 812, the process 800 involves storing changed or new chunks associated with the file in the browsable partition. At block 814, the process 800 involves storing updated chunk data in the file location table identifying the new locations of the various chunks of the file. For subsequent modifications to the file, in certain embodiments, only previously-modified chunks are copied from the browsable partition to the container partition, rather than performing a file move operation to transfer the entire file contained in the browsable partition.

The process 800 may provide the benefit of performing a move of a file from the same location, which may be faster than moving chunks from a local drive to, for example, a network-attached storage device (NAS). That is, a performance enhancement may be achievable by performing a file move operation, which may save transfer time from not copying the chunks into the container partition.

Additional Embodiments

Those skilled in the art will appreciate that in some embodiments, other types of data backup systems can be implemented while remaining within the scope of the present disclosure. In addition, the actual steps taken in the processes discussed herein may differ from those described or shown in the figures. Depending on the embodiment, certain of the steps described above may be removed, and/or others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A data storage system comprising:
   non-volatile data storage including:
      a browsable partition that is browsable by a native operating system of a host device; and
      a container partition that is not browsable by the native operating system of the host device; and
   a controller configured to backup a file in the non-volatile data storage at least in part by:
      receiving the file from a host device, the file including a plurality of chunks of data;
      storing the plurality of chunks of data in the browsable partition of the non-volatile data storage;
      determining that one or more of the plurality of chunks has been modified;
      storing the one or more modified chunks in the container partition of the non-volatile data storage;
      determining a new chunk associated with each of the one or more modified chunks; and
      storing the one or more new chunks in the browsable partition of the non-volatile data storage.

2. The data storage system of claim 1, wherein the browsable partition is searchable using a native file explorer of the native operating system of the host device.

3. The data storage system of claim 1, wherein the controller is further configured to maintain a substantially complete current version of each backup file stored in the non-volatile data storage in the browsable partition.

4. The data storage system of claim 1, wherein the controller is configured to generate a separate chunk file for each of the one or more new chunks.

5. The data storage system of claim 1, wherein the controller is configured to generate a separate chunk file for each of the one or more modified chunks.

6. The data storage system of claim 5, wherein the one or more chunk files each include a filename that indicates a storage location of the chunk file.

7. The data storage system of claim 1, wherein the controller is further configured to restore a prior version of the file at least in part by:
   retrieving the one or more modified chunks from the container partition; and
   combining the retrieved one or more modified chunks with one or more non-modified chunks of the plurality of chunks stored in the browsable partition to generate a restored file.

8. The data storage system of claim 7, wherein the controller is further configured to determine locations of the one or more modified chunks and the one or more non-modified chunks using a file location table maintained in the container partition.

9. The data storage system of claim 8, wherein the file location table includes hash values associated with chunks of data, the hash values indicating storage locations within the non-volatile data storage of the chunks of data.

10. A data storage system comprising:
    non-volatile data storage means including:
       a browsable partition that is browsable by a native operating system of a host; and
       a container partition that is not browsable by the native operating system of the host; and
    means for backing-up a file in the non-volatile data storage means at least in part by:
       receiving the file from a host, the file including a plurality of chunks of data;
       storing the plurality of chunks of data in the browsable partition of the non-volatile data storage means;
       determining that one or more of the plurality of chunks has been modified;
       storing the one or more modified chunks in the container partition of the non-volatile data storage means;
       determining a new chunk associated with each of the one or more modified chunks; and
       storing the one or more new chunks in the browsable partition of the non-volatile data storage means.

11. The data storage system of claim 10, wherein the means for backing-up the file is configured to maintain a file location table in the container partition indicating locations of the one or more new chunks in the browsable partition and the one or more modified chunks in the container partition.

12. A method of backing up data in a computing system, the method comprising:
    receiving a file from a host system, the file including a plurality of chunks of data;
    storing the plurality of chunks in a browsable partition of non-volatile data storage, the browsable partition being browsable by a native operating system of the host system;
    determining that one or more of the plurality of chunks has been modified;
    storing the one or more modified chunks in a container partition of the non-volatile data storage, the container partition not being browsable by the native operating system of the host system;
    determining a new chunk associated with each of the one or more modified chunks; and
    in response to said determining the new chunk, storing the one or more new chunks in the browsable partition of the non-volatile data storage.

13. The method of claim 12, further comprising searching the browsable partition using a native file explorer of the host system.

14. The method of claim 12, further comprising maintaining a file location table in the container partition indicating locations of the one or more new chunks and the one or more modified chunks.

15. The method of claim 12, further comprising maintaining a substantially complete current version of each backup file stored in at least a portion of the non-volatile data storage in the browsable partition.

16. The method of claim 12, wherein said storing the one or more new chunks in the browsable partition comprises generating a separate chunk file for each of the one or more new chunks.

17. The method of claim 12, wherein said storing the one or more modified chunks comprises generating a separate chunk file for each of the one or more modified chunks.

18. The method of claim 12, further comprising restoring a previous version of the file at least in part by:
retrieving the one or more modified chunks from the container partition; and
combining the retrieved one or more modified chunks with one or more non-modified chunks of the plurality of chunks stored in the browsable partition to generate the previous version of the file.

19. The method of claim 18, further comprising locating the one or more modified chunks and one or more non-modified chunks using a file location table stored in the container partition.

20. The method of claim 19, wherein the file location table includes hash values associated with chunks of data, the hash values indicating storage locations within the non-volatile data storage of the respective chunks of data.

\* \* \* \* \*